United States Patent [19]

Oohashi et al.

[11] Patent Number: 5,037,464
[45] Date of Patent: Aug. 6, 1991

[54] METHOD OF CLEANING AND CARBON COATING OPTICAL FIBER

[75] Inventors: Keiji Oohashi, Sakura; Hideo Suzuki, Funabashi; Shinji Araki; Tsuyoshi Shimomichi, both of Sakura, all of Japan

[73] Assignee: Fujikura Ltd., Tokyo, Japan

[21] Appl. No.: 444,186

[22] Filed: Nov. 30, 1989

[30] Foreign Application Priority Data

Dec. 1, 1988 [JP] Japan ............................. 63-304477
Mar. 22, 1989 [JP] Japan ............................. 1-70066

[51] Int. Cl.$^5$ ............................................. C03C 25/02
[52] U.S. Cl. ................................ 65/3.12; 65/60.6; 427/166
[58] Field of Search ............... 65/3.1, 3.12, 3.3, 3.43, 65/18.2, 60.3, 60.6, 32.4; 427/163, 166, 249; 350/96.33, 96.34; 501/37

[56] References Cited

U.S. PATENT DOCUMENTS

| | | | |
|---|---|---|---|
| 2,958,899 | 11/1960 | Stein | 18/8 |
| 3,788,827 | 1/1974 | DeLuca | 65/32.4 |
| 4,028,080 | 6/1977 | Di Vita et al. | |
| 4,113,350 | 9/1978 | Haines | 350/96.29 |
| 4,183,621 | 1/1980 | Kao et al. | 350/96.3 |
| 4,402,993 | 9/1983 | Aisenberg et al. | 427/163 |
| 4,512,629 | 4/1985 | Hanson et al. | 350/96.34 |
| 4,518,628 | 5/1985 | Biswas et al. | 427/255 |
| 4,659,354 | 4/1987 | Roba | 65/3.11 |
| 4,735,856 | 4/1988 | Schultz et al. | 427/163 |
| 4,755,577 | 7/1988 | Suzuki | 350/96.29 |
| 4,863,576 | 9/1989 | Collins et al. | 204/192.15 |
| 4,863,760 | 9/1989 | Schantz et al. | 427/163 |
| 4,874,222 | 10/1989 | Vacha et al. | 350/96.3 |

FOREIGN PATENT DOCUMENTS

| | | |
|---|---|---|
| 0308143 | 3/1989 | European Pat. Off. |
| 2493302 | 5/1982 | France |
| 58-184103 | 10/1983 | Japan |
| 59-83107 | 5/1984 | Japan |
| 2105371 | 3/1983 | United Kingdom |

OTHER PUBLICATIONS

Chaudhuri et al., Hermetic Coating on Optical Fibers, Proceeds. of SPIE, vol. 717, Reliability Considerations, 25-26 Sep. 1986, pp. 27-32.
Lemaire et al., Hydrogen Permeation in Optical Fibers with Hermetic Carbon Coatings, Electronic Letters, 13 Oct. '88, vol. 24, #21, pp. 1323-1324.
Lu et al., Recent Developments in Hermetically Coated Optical Fiber, Journal of Lightwave Tech., vol. 6, #2, Feb. 1988, pp. 240-244.
Amorphous Carbon Hermetically Coated Optical Fibers, Hugg, DiMarcello, Hart, AT&T Bell Laboratories, OFC '88/Tuesday afternoon/23, TUG2.
Hydrogen Permeation in Optical Fibres with Hermetic (List continued on next page.)

Primary Examiner—Richard V. Fisher
Assistant Examiner—John J. Bruckner
Attorney, Agent, or Firm—Sprung Horn Kramer & Woods

[57] ABSTRACT

A method for manufacturing carbon coated optical fiber includes the steps of removing adherent foreign material from a surface of a bare optical fiber, and forming at least one carbon layer on the surface thereof using a chemical vapor deposition method. The first step is performed by heating and drying the surface of the bare optical fiber in a 80 to 150 degrees C. temperature region to vaporize the adherent foreign material while supplying an inert gas to the surface thereof so as to substitute the inert gas for the vaporized adherent foreign material. The second step is performed by thermally decomposing at least one hydrocarbon compound to obtain a thermal decomposate of the hydrocarbon, and depositing the thermal decomposate on the surface of the bare optical fiber. Also, disclosed is a method for manufacturing carbon coated optical fiber including the steps of cooling a surface of a bare optical fiber to a temperature no higher than 50° C., and forming at least one carbon layer on the surface using a chemical vapor deposition method. The cooling step is performed by supplying a cooled inert gas to the surface of the bare optical fiber.

4 Claims, 6 Drawing Sheets

OTHER PUBLICATIONS

Carbon Coatings, Electronics Letters, Oct. 13, 1988, vol. 24, No. 21, pp. 1323, 1324.
Hermetically Coated Optical Fibers, Lu, Glaesemann, Kar, International Wire & Cable Symposium Proceedings 1987, Corning Glass Works, Corning, New York, pp. 241 to 244.
Recent Developments in Hermetically Coated Optical Fiber, Lu, Glaesemann, Vandewoestine and Kar, Journal of Lightwave Technology, vol. 6, No. 2, Feb. 1988, pp. 240 to 244.

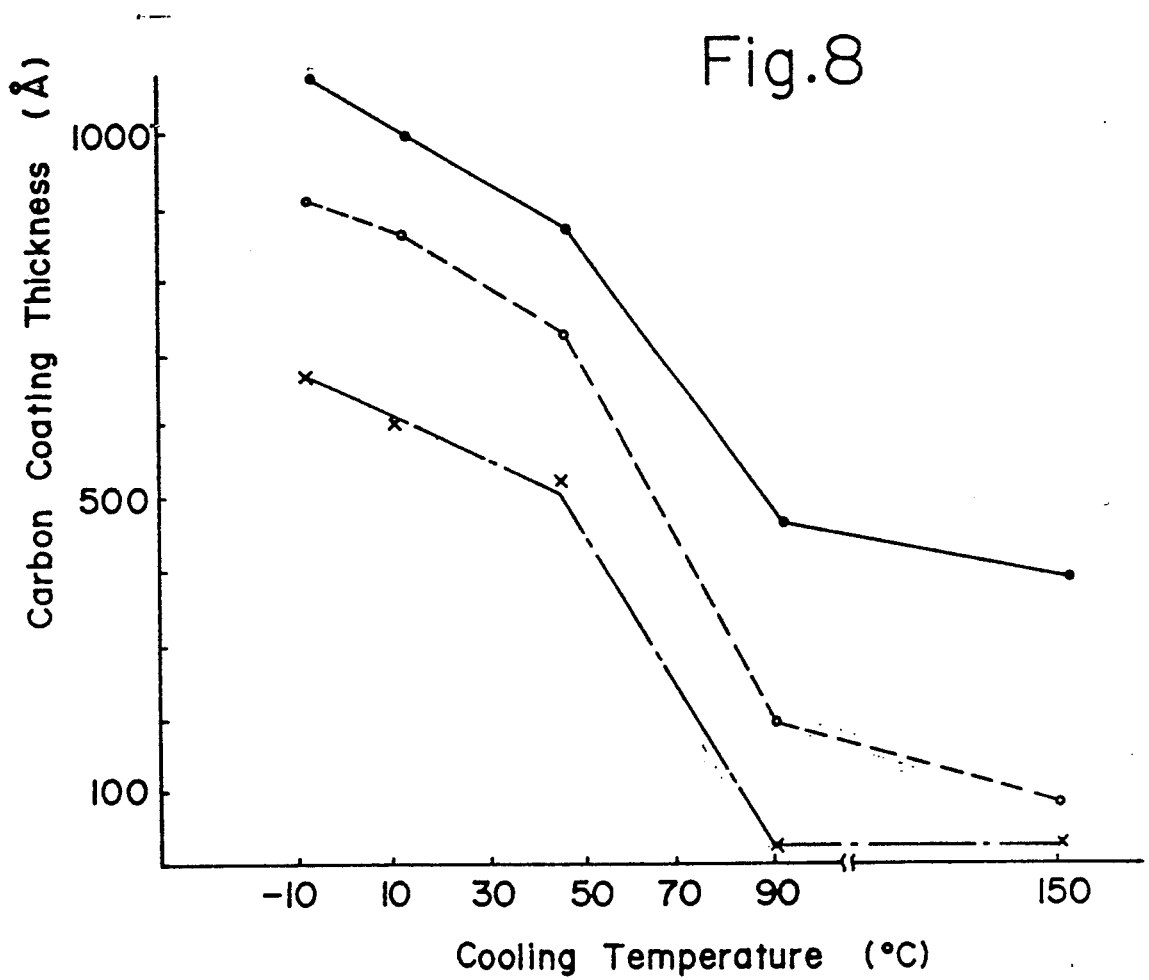

METHOD OF CLEANING AND CARBON COATING OPTICAL FIBER

BACKGROUND OF THE INVENTION

1. Field of the Invention

The present invention concerns a production method for carbon coated optical fibers. In particular, the present invention concerns a production method for carbon coated optical fibers demonstrating improved coating deposition rate.

2. Prior Art

Up to now, quartz optical fibers have been used for communication cables and the like. However, when these quartz optical fibers come into contact with hydrogen, the hydrogen diffuses into the fiber, and due to molecular vibration of the hydrogen molecules, there is the problem of increased absorption losses. Also, dopants contained in the cables, such as $P_2O_5$, $GeO_2$, and $B_2O_3$ and the like react with hydrogen that has diffused into the cable, thereby forming OH radicales that result in transmission losses. In order to remedy these problems, a method of charging the interior of these cables with hydrogen absorbing liquids (Japanese Patent Publication Application Kokai No. 61-251808) and other methods have been considered. However, with these methods, not only have the results been inadequate, but the processes are complicated and, practically speaking, not suitable.

In answer to this, recently Corning Glass (International Wire & Cable Symposium Proceedings 1987, pages 241-244, and Journal of Lightwave Technology, Vol. 6, No. 2, February 1988, pages 240-244) and AT&T (Electronic Letters, 13th October 1988 Vol. 24, No. 21, pages 1323-1324, and OFC '88/Tuesday Afternoon/23) have published a chemical vapor deposition method (CVD method) in which a carbon coating is formed on the optical fiber surface in order to improve its hydrogen resistance. With this production method, in a spinning furnace, as the bare uncoated optical fiber is fed into the thermal-CVD furnace, a hydrocarbon compound is thermally decomposed, thereby forming a carbon coating on the bare optical fiber surface. However, with such a process, as the fiber is heated in order to form the carbon coating, water molecules absorbed on the fiber surface form silanol groups. These silanol groups erode the optical fiber surface and cause minute cracks which tend to extend leading to the problem of deterioration in the mechanical strength of the fiber.

Furthermore, in addition to the previously mentioned water, nitrogen, oxygen, and the like are absorbed on the optical fiber surface which not only causes a deterioration in the coating deposition rate, but also causes the problem of diminished adherence of the coating to the underlying optical fiber.

Moreover, in the above described process, the entire CVD furnace used to deposit the carbon coating on the bare fiber must be maintained at the decomposition temperature of the starting material. Therefore, in order to produce a coated optical fiber of which the coating layer is sufficiently thick to provide suitable mechanical strength and hydrogen resistance properties, the spinning rate must be controlled at on the order of from 10 to 20 m/min which causes the additional problem of inability to achieve high speed spinning.

SUMMARY OF THE INVENTION

Accordingly, it is a first object of the present invention to provide a method for manufacturing carbon coated optical fiber with a high deposition rate for the coating in which a fiber with high mechanical strength can easily be obtained, and in which the coating has good adherence properties to the underlying bare optical fiber.

Moreover, it is a second object of the present invention to provide a method for manufacturing carbon coated optical fiber with a high spinning rate.

According to a first aspect of the present invention, there is provided an optical fiber manufacturing method, comprising (a) removing adherent foreign material from a surface of a bare optical fiber, and (b) forming at least one carbon layer on the surface thereof using a chemical vapor deposition method.

With such a method, because water molecules can be sufficiently removed from the bare fiber surface while forming the carbon coating which would otherwise form silanol groups, and thereby erosions, it is possible to produce a carbon coated optical fiber of high mechanical strength. Also, because oxygen and nitrogen which interfere with the formation of the carbon coating can be removed, a carbon coating of the desired thickness can be formed in a short period, and at the same time, a carbon coating with suitable adherence properties to the underlying bare optical fiber.

According to a second aspect of the present invention, there is provided an optical fiber manufacturing method, comprising (a) cooling a surface of a bare optical fiber to a temperature no higher than 50° C., and (b) forming at least one carbon layer on the surface thereof using a chemical vapor deposition method.

By this means, a large temperature gradient is created between the interior of the CVD furnace and the surface of the bare optical fiber and the carbon coating can thereby be deposited with high efficiency. Accordingly, a carbon coated optical fiber having sufficient mechanical strength and hydrogen resistance can be spun at a high rate.

With the optical fibers produced by either of the methods, a carbon coating of sufficient thickness to prevent hydrogen penetration can be formed. Therefore, hydrogen does not diffuse into the interior of the fibers, and accordingly, transmission losses are minimized.

BRIEF DESCRIPTION OF THE DRAWINGS

The present invention will now be illustrated with reference to the accompanying drawings wherein:

FIG. 8 is a plot of the thickness of the carbon coating produced in the production method according to the present invention versus the temperature to which the fiber is cooled for the coating deposition process.

DESCRIPTION OF THE PREFERRED EMBODIMENTS

Figure 1:
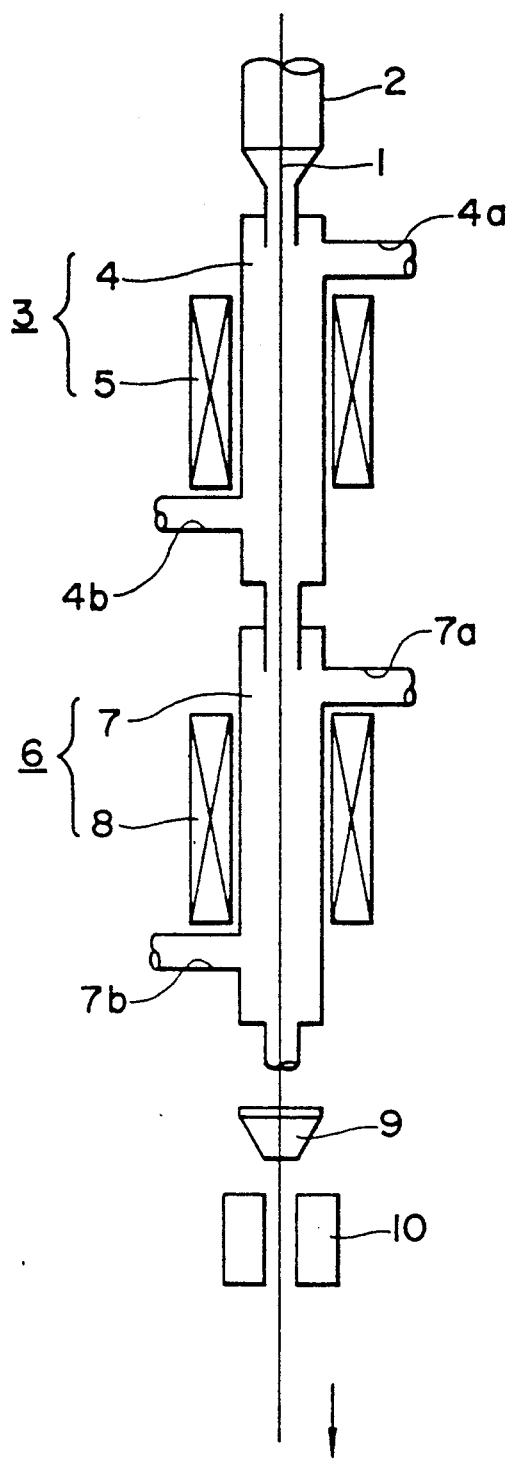
FIG. 1 is a schematic drawing of a suitable apparatus to be employed in the method of an example of the preferred embodiment of the present invention.

FIG. 1 shows a suitable production apparatus to be employed in the coated carbon fiber manufacturing method of a first example of the preferred embodiment according to the present invention. In the drawing, reference numeral 1 indicates the bare optical fiber. This bare optical fiber 1 is the hot spun optical fiber produced in optical fiber spinning furnace 2 from the parent optical fiber material (not shown). As this bare optical fiber 1 is spun, it is supplied to the inside of heat drying furnace 3 which is provided on the lowest part of optical fiber spinning furnace 2, the connection being completely air tight. The purpose of this heat drying furnace 3 is to remove water, oxygen, nitrogen molecules and the like absorbed on the surface of the bare optical fiber 1 which is spun in the uppermost portion of optical fiber spinning furnace 2. This heat drying furnace 3 is composed of an approximately cylindrical heat drying tube 4 for drying the bare optical fiber and a heat generating unit 5 which generates the heat. Moreover, an inert gas supply pipe 4a is provided on the upper portion of heat drying tube 4 in order to create an inert atmosphere within heat drying tube 4, and an inert gas exhaust pipe 4b is provided on the lower portion of heat drying tube 4 in order to exhaust the inert gas. CVD furnace 6 is provided air-tightly on the lowermost portion of heat drying tube 4. In this CVD furnace 6, a carbon coating is formed by the CVD method on the bare optical fiber after the fiber has water, oxygen, nitrogen molecules and the like removed from its surface in the heat drying furnace overhead. This CVD furnace 6 is composed of a reaction pipe 7 of approximately cylindrical shape within which the CVD reaction is caused to proceed, thereby depositing the carbon coating on the surface of the bare optical fiber, and a heat generating unit 8 which provides heat for the CVD reaction. A starting material compound supply tube 7a is provided on the upper portion of reaction pipe 7 in order to supply the starting material compound within reaction pipe 7, and an exhaust pipe 7b is provided on the lower portion of reaction pipe 7 in order to exhaust reaction end gasses and the like. The heat generating unit 8 used to heat reaction pipe 7 may be chosen as suitable for the type of starting material compound. A resistance furnace, induction furnace, or an infrared furnace may be used as well as a furnace using high frequency waves or microwaves to generate plasma, thereby causing the starting material compound to decompose, thus forming ion. On the lowermost portion of CVD furnace 6, a liquid resin coating unit 9 and a hardening unit 10 are provided in series, by which means a protective coating layer may be applied over the carbon coating layer formed in CVD furnace 6.

The process of the manufacturing method for an optical fiber according to the present invention using the above described apparatus is as follows:

Optical fiber starting material is heated in optical fiber spinning furnace 2 where it is spun. As it is spun into optical fiber, the material is then successively provided from the lower part of spinning furnace 2 to drying furnace 3, CVD furnace 6, liquid resin coating unit 9, and hardening unit 10, following a linear path as it is supplied through their respective central portions. Then, as an inert gas is supplid to heat drying tube 4 by inert gas supply pipe 4a, heat drying tube 4 is heated to a fixed temperature by heat generating unit 5. For this interior of heat drying tube 4, a temperature of on the order of from 80° to 150° C. is suitable. When a temperature of below 80° C. is employed, water, oxygen, nitrogen molecules and the like absorbed on the surface of bare optical fiber 1 are not sufficiently removed. Also, the inert gas supplied to heat drying tube 4 should ideally be high purity helium or argon gas having 0% relative humidity. The rate of supply of the inert gas is chosen based on the linear velocity of the bare optical fiber 1 and the reaction rate in CVD furnace 6. For example, for a heat drying tube 4 of 20 mm diameter, on the order of from 2 to 10 liter/min is suitable. With a flow rate of less than 2 liter/min, it becomes difficult to sufficiently displace water, oxygen, nitrogen molecules and the like absorbed on the surface of the bare optical fiber 1 by the inert gas. With a flow rate of greater than 10 liter/min, the bare optical fiber 1 tends to flutter within the heat drying tube 4, and thus such a flow rate is unsuitable. Because the absorbed matter on the surface of the bare optical fiber 1 is constituted mainly of water, nitrogen, oxygen molecules and the like, these contaminants may be easily displaced from the fiber surface by the inert gas. Therefore, this heat drying can suitably remove water, nitrogen, oxygen molecules and the like from the fiber surface. The bare optical fiber 1, its surface thus cleared of impurities, is then passed into CVD furnace 6 where the carbon coating is formed, an airtight seal being maintained. As the starting material compound used to form the carbon coating is supplied to reaction pipe 7 by starting material compound supply tube 7a, heat is applied to reaction pipe 7 by heat generating unit 8. As long as it is a carbon containing compound, the type of starting material compound supplied from starting material compound supply tube 7a which is thermally decomposed to form the carbon coating is not particularly limited, but from the viewpoint of the characteristics of the formed carbon layer and the rate of its formation, carbon compounds containing no more than 15 carbon atoms and halogen containing hydrocarbons are desirable. The starting material compound may be supplied in the gas state and may be supplied diluted with the same inert gas supplied to heat drying tube 4. The flow rate is chosen depending on the type of starting material compound, the heating temperature, and similar factors, but generally a rate of on the order of 0.2 to 1.0 liter/min is preferable. The heating temperature of heating unit 8 is chosen depending on the type of the above mentioned starting material compound, but is generally on the order of from 400° to 1200° C. When a temperature of less than 400° C. is used, thermal decomposition of the starting material compound does not proceed. When a temperature of higher than 1200° C. is used, the structure of the carbon layer formed on the bare optical fiber surface approaches that of graphite and is thus brittle and unsuitable. Furthermore, because the annealing temperature of the quartz material from which the bare optical fiber 1 is formed is in the vicinity of 1170° C., when the spun fiber is reheated, changes occur in its crystalline structure and it begins to demonstrate brittle properties, which point is also undesirable. As described, within the CVD furnace 6, a carbon coating layer is formed on the surface of the bare optical fiber 1 from the starting material compound, this carbon coating layer having the ability to resist hydrogen penetration. The bare optical fiber 1, having thus been carbon coated is then introduced into the liquid resin coating unit 9 provided below, then into hardening unit 10 in order to harden the liquid resin. Onto the carbon coated optical fiber thus introduced into the liquid resin coating unit 9, a protective coating layer of ultraviolet setting resin, heat setting, or the like is applied. The liquid resin layer is then hardened in a hardening unit 10 having the appropriate conditions to form carbon coated optical fiber 3 with an outer protective resin layer.

In this embodiment, simply one carbon coating layer was formed on the bare optical fiber 1, but the present invention is by no means so limited and 2 or more successive layers may be formed. Moreover, in this embodiment, only one protective coating layer was formed. Similarly, a plurality of protective coating layers may be formed as well.

With the above described optical fiber manufacturing method, water molecules absorbed on the surface of the bare optical fiber 1 are removed by heat drying in heat drying furnace 3, after which the carbon coating is applied. Accordingly, eroding silanol groups are not formed on the bare optical fiber 1 surface, and thus, a mechanically strong carbon coated optical fiber is formed. Similarly, because nitrogen and oxygen molecules are also removed during the heat drying which would otherwise interfere with formation of the carbon layer, a carbon coating having good adherence properties can be formed on the bare optical fiber 1 surface, and at the same time, the carbon coating deposition rate can be improved. Moreover, the carbon coating layer formed on the surface of bare optical fiber 1 has the ability to resist hydrogen penetration, the transmission losses of the obtained optical fiber are small.

With the above example, absorbed contaminants were removed from the bare optical fiber 1 surface by the heat drying, but the process for removing absorbed matter from the optical fiber surface is by no means limited to only that process.

Figure 2:
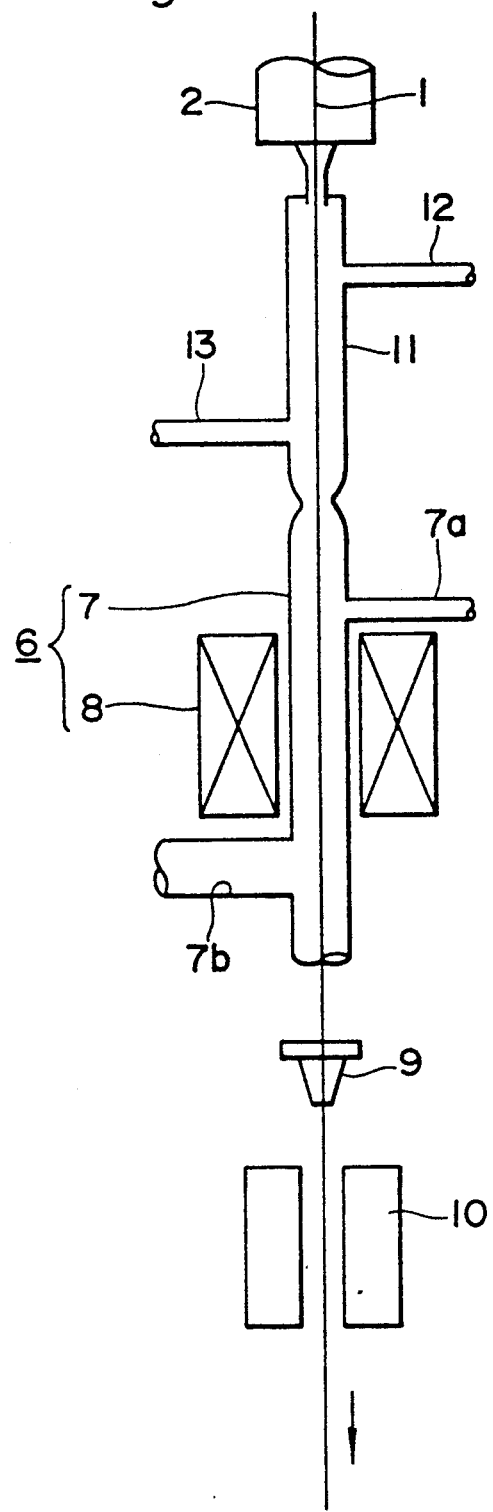
FIGS. 2 and 3 are both schematic drawings of a suitable apparatus to be employed in the method of an example of the preferred embodiment of the present invention.

A suitable manufacturing apparatus for one example of the manufacturing method for an optical fiber according to the present invention is shown in FIG. 2.

The manufacturing apparatus shown in FIG. 2 differs from that apparatus shown in FIG. 1 in that the apparatus of FIG. 2 is provided with a cooling means on the uppermost portion of CVD furnace 6 rather than the heat drying furnace 3. With this cooling means, the bare optical fiber 1 which was spun in the uppermost portion of spinning furnace 2 is cooled so that the carbon coating layer may be deposited with ease on the bare optical fiber 1 surface in the CVD furnace 6 below. This cooling means is comprised of a roughly cylindrical cooling pipe 11 which cools the bare optical fiber 1, a coolant supply pipe 12 which supplies coolant to the cooling pipe 11, and a coolant discharge pipe 13 by which means the coolant is discharged from cooling pipe 11.

The method of supplying coolant to the cooling pipe 11 is by no means limited to the cooling means in this embodiment, as long as no deleterious effect is given to the bare optical fiber 1. For example, it goes without saying that it would be acceptable to provide a cooling bath surrounding and thereby cooling the bare optical fiber 1.

Below the lowermost portion of the above mentioned cooling means, CVD furnace 6 is provided by means of an airtight connection. Moreover, below the lowermost portion of CVD furnace 6 is provided a liquid resin coating unit 9 and then hardening unit 10, completely identical to the manufacturing apparatus shown in FIG. 1, by which means an outer protective resin layer may be applied after the carbon coating layer is applied on the bare optical fiber 1 surface.

The process of the manufacturing method for an optical fiber according to the present invention using the above described apparatus is as follows:

As the optical fiber starting material is hot spun in optical fiber spinning furnace 2, the optical fiber is successively introduced into the cooling means provided below the lowermost portion of spinning furnace 2, CVD furnace 6, liquid resin coating unit 9, and then hardening unit 10, supplied through their central axes at a fixed linear velocity. Then, coolant is supplied to the cooling pipe 11 by coolant supply pipe 12 which cools the surface of the bare optical fiber 1 to a fixed temperature. This cooling temperature may be appropriately chosen based on the coolant flow rate, the spinning rate and the like, but it must be no higher than 50° C. When the cooling temperature is 50° C. or less, the temperature gradient in the CVD furnace 6 is large, and thereby, the carbon coating layer may easily be applied on the bare optical fiber 1 surface. When the cooling temperature is 50° C. or higher, the carbon coating deposition rate becomes low and the bare optical fiber 1 must remain in the CVD furnace 6 for a long period, leading to fluttering of the fiber in the CVD furnace 6 and ununiformity in the carbon coating along the longitudinal axis of the fiber which is undesirable. By bringing the coolant into contact with the bare optical fiber 1, the temperature of its surface is lowered. For example, cooled helium or similar inert gasses may be used as a coolant. By this means, a large temperature gradient is created between the bare optical fiber 1 and the reaction pipe 7, thereby the carbon coating fiber may be efficiently deposited. Accordingly, a sufficiently thick carbon coating layer having hydrogen resistant properties and mechanical strength may be spun at a high rate. After the bare optical fiber 1 is introduced below into the CVD furnace 6 and the carbon coating is formed under airtight conditions, it is passed into liquid resin coating unit 9 and then hardening unit 10 by which means a protective coating layer is formed. The presently described process can be carried out in a manner completely identical to the previous embodiment according to the present invention.

In this way, by means of the manufacturing method according to the present invention, because the carbon coating layer is formed on bare optical fiber 1 after sufficient cooling, a large temperature gradient is created between the bare optical fiber 1 and the reaction pipe 7, thereby the carbon coating fiber may be efficiently deposited. Accordingly, the spinning rate of the optical fiber can be improved. Furthermore, because the carbon coating does not adhere to the inner wall of reaction pipe 7, blockage can be prevented and spinning can be carried out continuously over a long period of time. Also, because the optical fiber can be spun at a high rate, a longitudinally uniform optical fiber can be obtained. Moreover, because the carbon coating layer formed on the obtained optical fiber has the ability to resist hydrogen penetration, transmission losses are low. Furthermore, because water, nitrogen, oxygen molecules and the like adherent to the surface of the bare optical fiber 1 can be displaced by the coolant, e.g., inert gases such as helium gas or the like for bringing it into contact with the fiber in the cooling pipe 11, an optical fiber with high mechanical strength like the one produced in the previous embodiment according to the present invention may be obtained. The coolant used in the cooling pipe 11 may be the same as an inert gas for using to dillute a reaction gas in the reaction pipe 7, or may be different from it.

Figure 3:
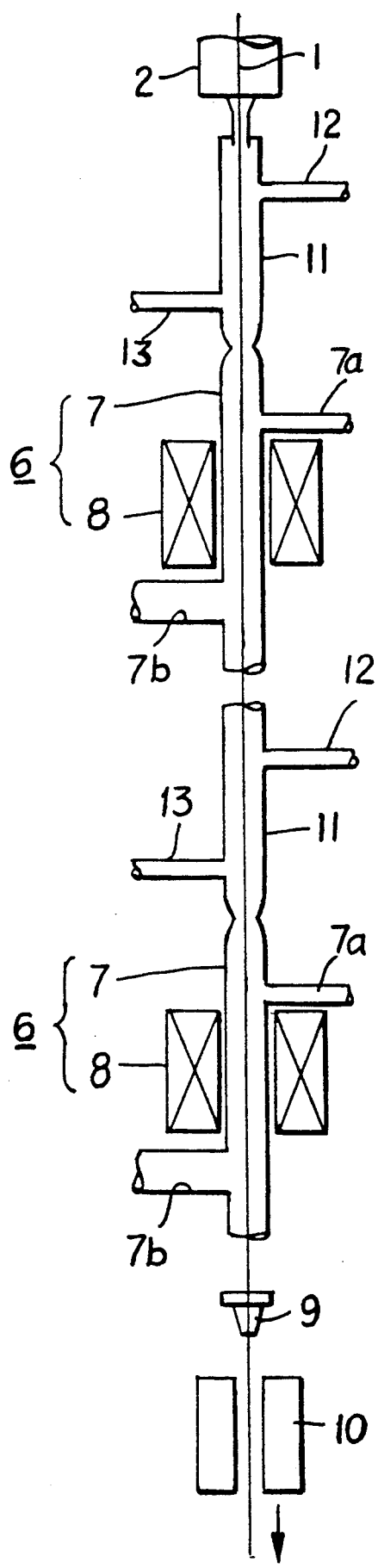

In the embodiment, simply one carbon coating layer was formed on the bare optical fiber 1, but the present invention is by no means so limited and 2 or more sucessive layers may be formed. For example, as shown in FIG. 3, when the apparatus shown in FIG. 2 is connected in series, it is possible to continuously form two or more carbon coating layers on surface of the bare optical fiber 1 and the spinning rate can be all the more improved. When more than one carbon coating layer is formed on the surface of bare optical fiber 1 in this way, an optical fiber having greater hydrogen resistance and mechanical strength can be obtained.

Moreover, in the embodiments shown in FIGS. 2 and 3, only one protective coating layer was formed. However, the present invention is in no way so limited and a plurality of protective coating layers may be formed as well.

In the examples to follow, the present invention will be concretely described.

EXAMPLE 1

On the lowermost part of the optical fiber spinning furnace for spinning the bare optical fiber, a heat drying furnace and CVD furnace are airtightly provided. Furthermore, at the lowermost portion of the above, a resin coating unit and hardening unit are provided. Such an apparatus is formed in is the same way as the apparatus shown in FIG. 1. The heat drying furnace uses a silicon carbide heating furnace and within its interior a heat drying pipe of 20 mm diameter is provided. The reaction pipe for the CVD furnace is a quartz tube of 40 mm diameter and it is heated by an infrared lamp. The resin coating unit uses a die pot with ultraviolet setting resin solution sealed within. The hardening unit uses an ultraviolet lamp.

Then, a 30 mm diameter, single-mode optical fiber starting material with a core impregnated with $GeO_2$ as a dopant was placed in the above mentioned spinning furnace, where it was spun at 30 m/min into 125 μm diameter optical fiber at 2000° C. At the same time, the heat drying furnace was heated to 100° C. and a mixture of helium gas at 2 liter/min and argon gas at 3 liter/min was supplied to the interior of the heat drying pipe by the inert gas supply pipe. At this time, the relative humidity within the heat drying furnace was 1% and the oxygen concentration was 0.185%. Furthermore, while heating the CVD furnace to 1000° C., benzene vapor diluted to 5 vol % in argon gas was supplied at 0.5 liter/min. Then, the bare optical fiber was caused to travel through the heat drying furnace and the CVD furnace, and after the fiber surface was heat dried, a carbon coating layer was formed. Next, the optical fiber was passed through the urethane acrylate resin solution (Young's modulus: 50 kg/mm², elongation: 10%) contained within the die pot, thereby applying a urethane acrylate resin coating over the carbon coating which was then hardened by illuminating the coated fiber with ultraviolet light to form a 250 μm diameter optical fiber.

The optical fiber thus prepared was then dipped in methylene chloride solution and the protective coating was thereby removed. The electrical resistance of the carbon coated optical fiber was then measured and found to be 10 kΩ·cm from which it could be ascertained that the quantity of adherent carbon coating was sufficient. The thickness of the carbon coating layer was measured using an electron microscope and was found to be 0.1 μm, whereby it could be ascertained that the optical fiber possessed sufficient ability to resist hydrogen penetration.

EXAMPLES 2-5

By regulating the flow rate of inert gas into the heat drying furnace, the relative humidity within was adjusted to 2.5%, 5%, 7.5%, and 10% respectively for examples 2-5, which were otherwise carried out in a manner entirely identical to that of example 1 to produce respective optical fibers.

COMPARATIVE EXAMPLES 1-4

By regulating the flow rate of inert gas into the heat drying furnace, the relative humidity within was adjusted to 15%, 20%, 30%, and 40% respectively for comparative examples 1-4, which were otherwise carried out in a manner entirely identical to that of example 1 to produce respective optical fibers.

TEST EXAMPLE 1

Figure 4:
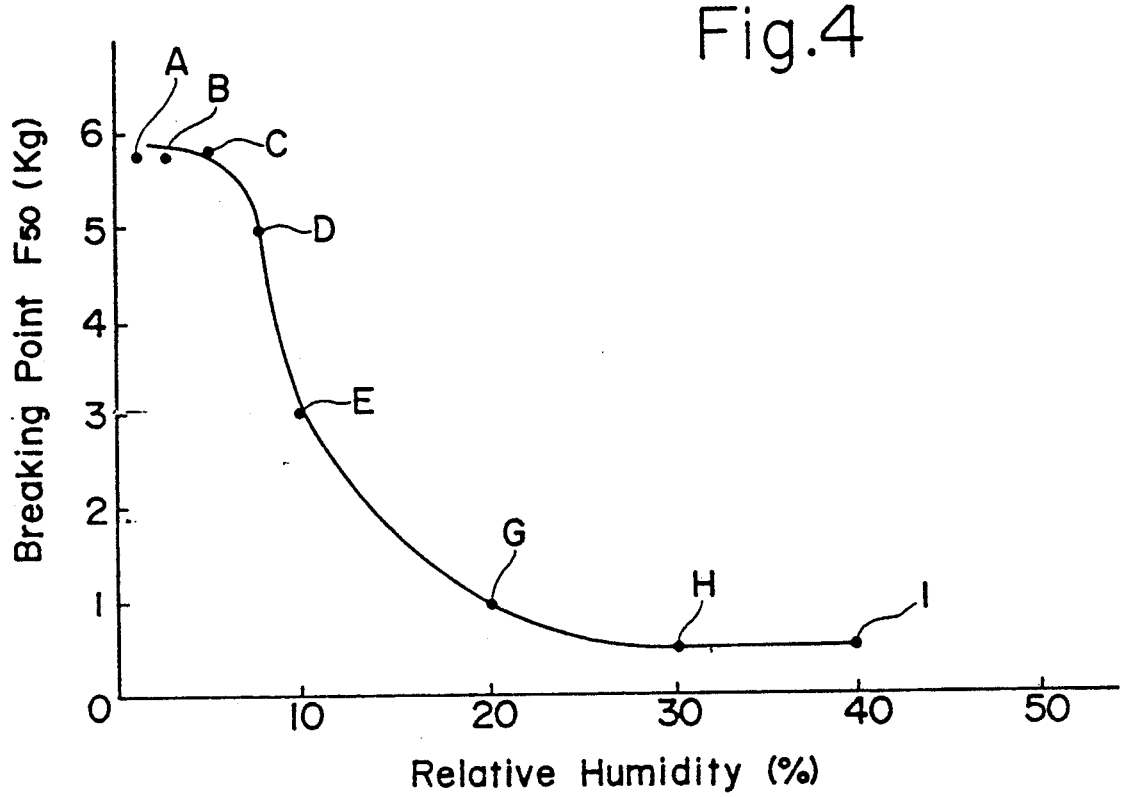
FIG. 4 is a plot of the breaking point of the carbon coated optical fiber produced by the method of this invention versus relative humidity in the heat drying furnace employed in the method.

The respective optical fibers obtained in the above examples 2-5 and comparative examples 1-4 were arranged in bundles of 20 each and were subjected to tensile stress at a gauge length of 3 m and a strain rate of 10% per minute, and the fracture probability was plotted against tensile strength using a Weibull type plot to determine tensile strength at a fracture probability of 50%. These results are plotted versus relative humidity in FIG. 4 which shows the relationship between tensile strength and relative humidity of the heat drying oven. In FIG. 4, A through E represent examples 2-5 and F through I represent comparative examples 1-4.

From these results, it was determined that a relative humidity of no greater than 10% is desirable and it could also be determined that when the surface of the optical fiber is sufficiently dried prior to applying the carbon coating, that an optical fiber of high tensile strength can be obtained.

TEST EXAMPLE 2

Figure 5:
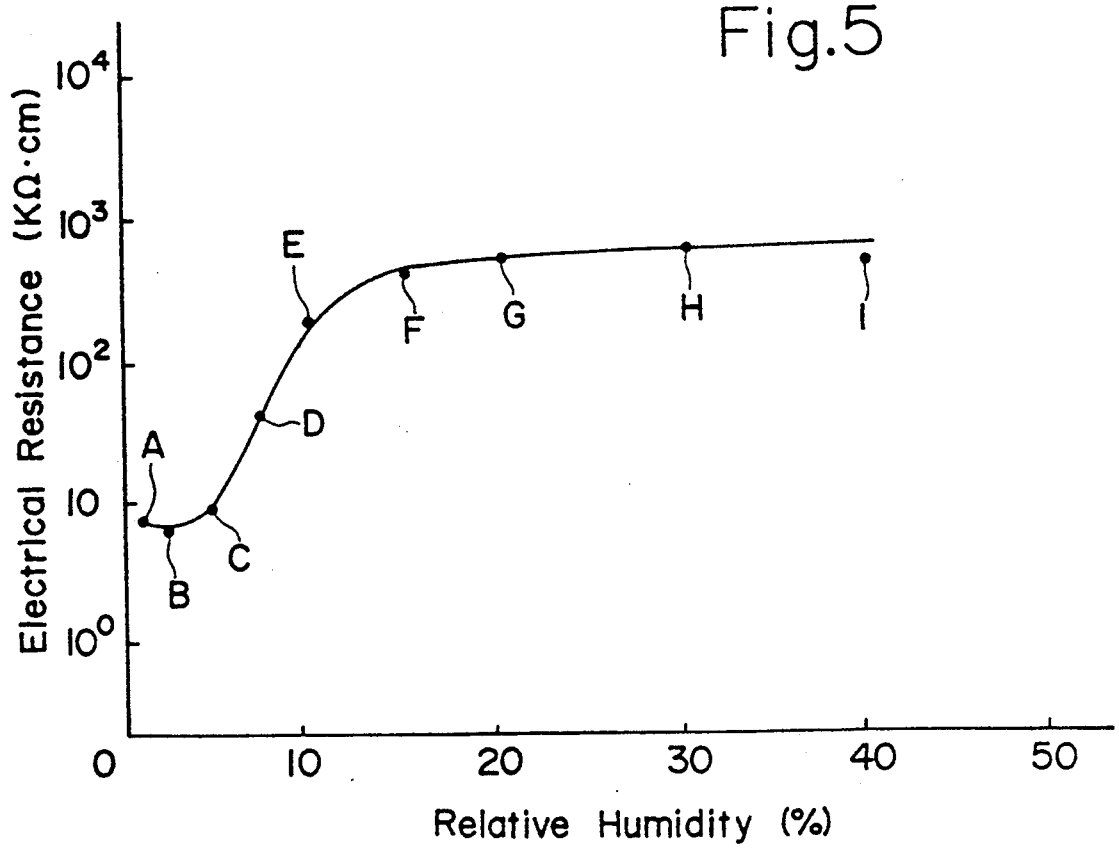
FIG. 5 is a plot of the electrical resistance of the carbon coated optical fiber produced in the method of this invention versus the relative humidity in the heat drying furnace employed in the method.

Furthermore, in order to investigate the relationship between relative humidity of the heat drying oven and the amount of deposited carbon coating, the electrical resistance of the above obtained optical fibers was measured. These results are shown in FIG. 5. Because these fibers demonstrated an electrical resistance that was small to the extent that the amount of deposited carbon coating was great, from FIG. 5 it could be seen that a relative humidity of no greater than 10% in the heat drying oven is desirable and that to the extent that the surface of the optical fiber was rid of moisture, the amount of deposited carbon coating was great. In FIG.

4, A through E represent examples 2-5 and F through I represent comparative examples 1-4.

EXAMPLES 6 and 7

By regulating the flow rate of inert gas into the heat drying furnace, the oxygen concentration within was adjusted to 0.5 vol % and 1 vol % respectively for examples 6 and 7, which were otherwise carried out in a manner entirely identical to that of example 1 to produce respective optical fibers.

COMPARATIVE EXAMPLES 5-8

By regulating the flow rate of inert gas into the heat drying furnace, the oxygen concentration within was adjusted to 2 vol %, 4 vol %, 6 vol %, and 10 vol % respectively for comparative examples 6 and 7, which were otherwise carried out in a manner entirely identical to that of example 1 to produce respective optical fibers.

TEST EXAMPLE 3

Figure 6:
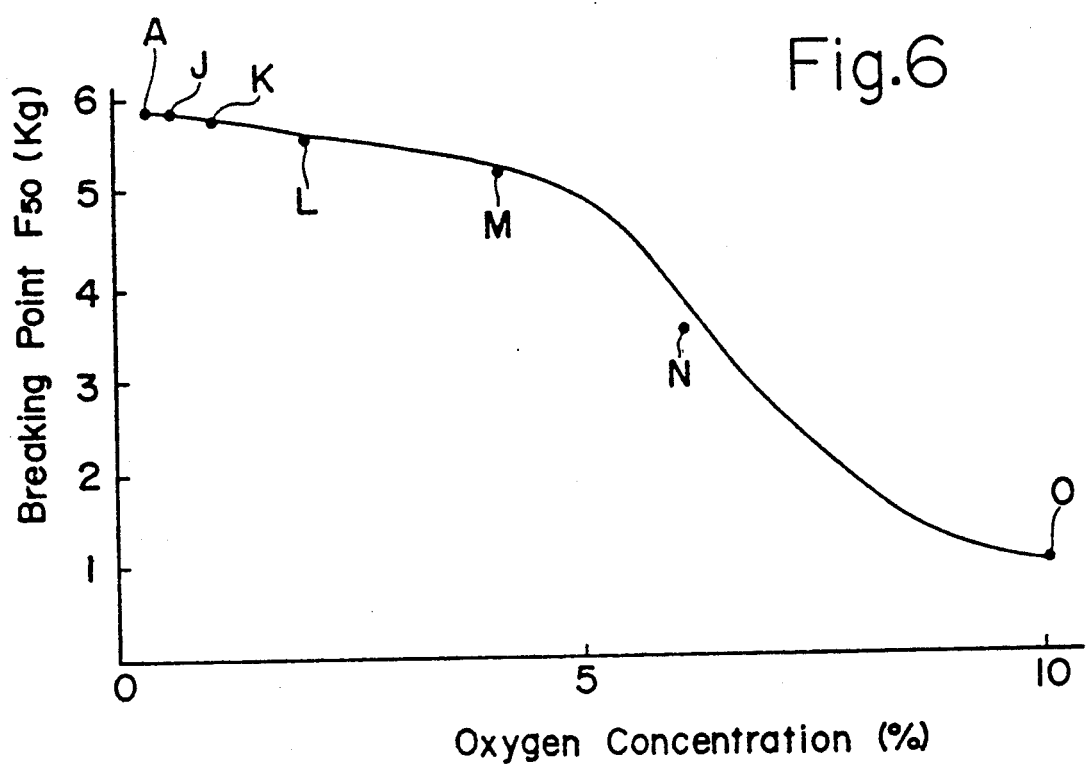
FIG. 6 is a plot of the breaking point of the carbon coated optical fiber produced by the method of this invention versus oxygen concentration in the heat drying furnace employed in the method.

The respective optical fibers obtained in the above examples 1, 6, and 7 and comparative examples 5-8 were arranged in bundles of 20 each and were subjected to tensile stress at a gauge length of 3 m and a strain rate of 10% per minute, and the fracture probability was plotted against tensile strength using a Weibull type plot to determine tensile strength at a fracture probability of 50%. These results are plotted versus oxygen concentration in FIG. 6 which shows the relationship between tensile strength and oxygen concentration of the heat drying oven. From these results, it could be determined that when the oxygen concentration is no greater than 1 vol % in the heat drying furnace when the surface of the bare optical is dried prior to applying the carbon coating, that an optical fiber of high tensile strength can be obtained. In FIG. 6, A, J, and K represent examples 1, 6, and 7 and L through O represent comparative examples 5-8 respectively.

TEST EXAMPLE 4

Figure 7:
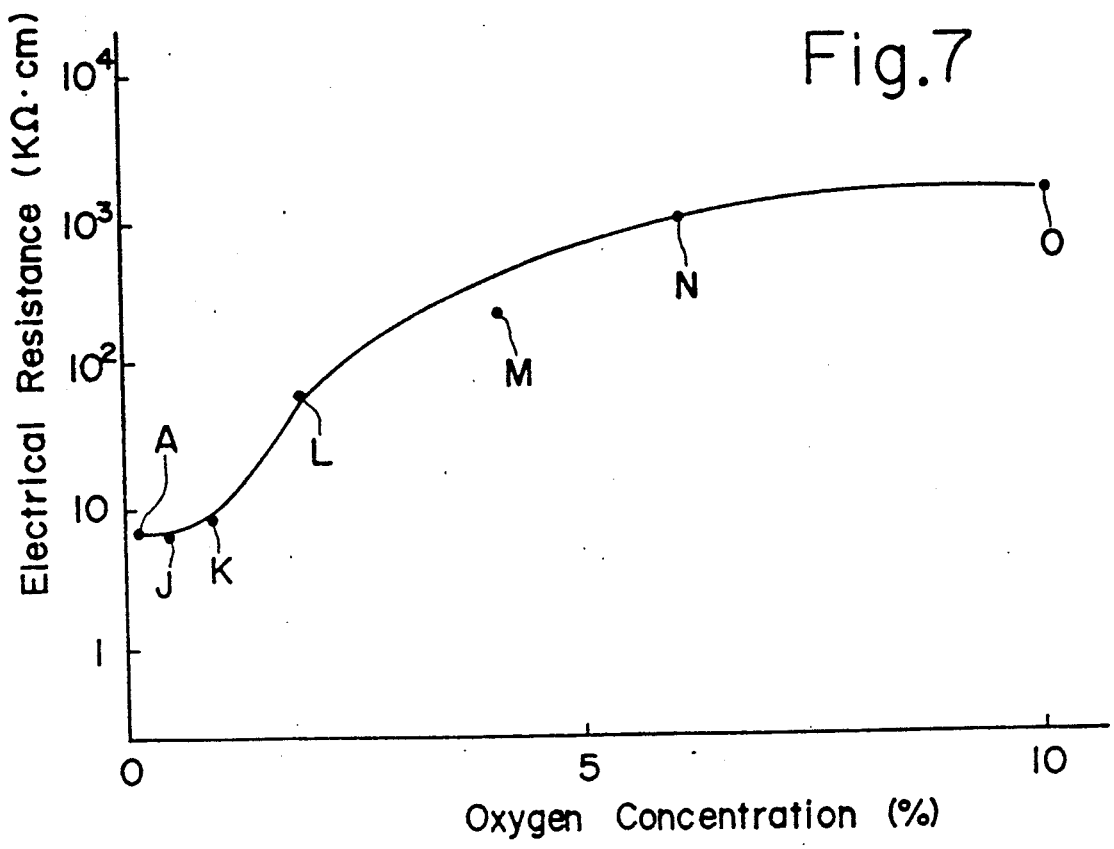
FIG. 7 is a plot of the electrical resistance of the carbon coated optical fiber produced in the method of this invention versus oxygen concentration in the heat drying furnace employed in the method.

Furthermore, in order to investigate the relationship between oxygen concentration in the heat drying oven and the amount of deposited carbon coating, the electrical resistance of the above obtained optical fibers was measured. These results are shown in FIG. 7. From these results, it could be determined that when the oxygen concentration is no greater than 1 vol % in the heat drying furnace when the surface of the bare optical is dried prior to applying the carbon coating, that the carbon coating deposition rate improves and that the amount of deposited carbon coating improves. In FIG. 7, the identification letters represent the same examples as in FIG. 6.

EXAMPLE 8

On the lowermost part of the optical fiber spinning furnace for spinning the bare optical fiber, a cooling pipe and a quartz tube heated with a infrared lamp for the CVD furnace are airtightly provided. Furthermore, at the lowermost portion of the above, a resin coating unit and hardening unit are provided. Such an apparatus is formed is the same way as the apparatus shown in FIG. 2. The resin coating unit uses a die pot with ultraviolet setting resin solution sealed within. The hardening unit uses an ultraviolet lamp.

Then, a 30 mm diameter, single-mode optical fiber starting material with a core impregnated with GeO$_2$ as a dopant was placed in the above mentioned spinning furnace, where it was spun at 30 m/min into 125 μm diameter optical fiber at 2000° C., after which the optical fiber surface was cooled to 40° C. with dry helium gas as the coolant in the cooling pipe. At the same time, while heating the CVD furnace to 1100° C., benzene vapor as the starting material compound diluted to 5 vol % in argon gas was supplied at 0.5 liter/min via the starting material compound supply tube. The end reaction gas and by products were removed by applying a vacuum of −6 mm Hg to the exhaust pipe. Then, the bare optical fiber was caused to travel through the cooling pipe and the CVD furnace, and after the fiber surface was heat dried, a carbon coating layer was formed. Next, the optical fiber was passed through the urethane acrylate resin solution (Young's modulus: 70 kg/mm$^2$, elongation: 60%) contained within the die pot, thereby applying a urethane acrylate resin coating over the carbon coating which was then hardened by illuminating the coated fiber with ultraviolet light to form a 300 μm o.d. optical fiber.

EXAMPLE 9

Two of the apparatuses used in example 8 were connected in series, thus forming an apparatus as shown in FIG. 3. Using the same optical fiber starting material as used in example 8, material was spun at 60 m/min into 125 μm o.d. optical fiber at 2000° C. In the upper apparatus, with a fiber surface temper 10° C., CVD furnace temperature of 1100° C., 1,1,1-trichoroethylene vapor as the starting material compound diluted to 5 vol % in argon gas supplied at 4 liter/min, and conditions otherwise identical those of example 8, a carbon coating layer was formed.

Next, in the lower apparatus, cooling the optical fiber surface to 44° C. and conditions otherwise identical to those in the upper apparatus, a second carbon coating layer was formed over the first applied layer. The optical fiber thus formed was then passed through the urethane acrylate resin solution (Young's modulus: 70 kg/mm$^2$, elongation: 60%) contained within the die pot, thereby applying a urethane acrylate resin coating over the carbon coating which was then hardened by illuminating the coated fiber with ultraviolet light to form a 250 μm o.d. optical fiber.

EXAMPLE 10

An optical fiber was formed with the surface of the bare optical fiber cooled to 10° C. and otherwise identical conditions to those of example 8.

EXAMPLE 11

An optical fiber was formed at a spinning rate of 50 m/min and otherwise identical conditions to those of example 8.

EXAMPLE 12

An optical fiber was formed with the surface of the bare optical fiber cooled to 10° C. in the upper apparatus and to 20° C. in the lower apparatus and otherwise identical conditions to those of example 9.

EXAMPLE 13

An optical fiber was formed at a spinning rate of 100 m/min and otherwise identical conditions to those of example 9.

COMPARATIVE EXAMPLE 9

An optical fiber was formed with the surface of the bare optical fiber at 90° C., being not cooled and otherwise identical conditions to those of example 8.

COMPARATIVE EXAMPLE 10

An optical fiber was formed with the surface of the bare optical fiber at 60° C. and otherwise identical conditions to those of example 8.

COMPARATIVE EXAMPLE 11

An optical fiber was formed without using a cooling pipe and with the surface temperature of the optical fiber at 400° C. just before entering the reaction pipe in the lower apparatus and otherwise identical conditions to those of example 8.

TEST EXAMPLE 5

Using each of the fibers formed in Examples 8 through 13 and comparative examples 9 through 11 at a length of 1 km, bundles of approximately 150 mm were formed. Within a hydrogenenation vessel, the bundles were caused to stand in a hydrogen atmosphere of 1 atm at 80° C. for 48 hours. Afterwards, using light with a wavelength of 1.24 μm, the increase in transmission losses was measured for each respective bundle. These results are shown in table 1.

TABLE 1

| Sample | Increase in Transmission Losses (dB/km) | Carbon-coating Layer Thickness (Å) |
| --- | --- | --- |
| Example 8 | 0.1 | 900 |
| Example 9 | 0.05 | 1200 |
| Example 10 | 0.07 | 1050 |
| Example 11 | 0.15 | 800 |
| Example 12 | 0.02 | 1500 |
| Example 13 | 0.13 | 800 |
| Comparative Example 9 | 0.97 | 400 |
| Comparative Example 10 | 0.50 | 600 |
| Comparative Example 11 | 1.03 | 450 |

From the above results, it can be seen that with each of the optical fibers from examples 8 through 13, when the fiber is cooled to at least 50° C. prior to applying the carbon coating layer, a sufficiently thick carbon coating layer can be formed, even at a high spinning rate and it can be seen that the transmission losses are low.

It can thereby be seen from table 1 that it is desirable to maintain the cooling tube at a temperature no higher than 50° C.

TEST EXAMPLE 6

Using the same apparatus as in example 8, 1,1,1-trichoroethylene vapor as the starting material compound diluted to 5 vol % in argon gas supplied at 4 liter/min, and a CVD furnace temperature of 1100° C., the relationship between thickness of the formed carbon coating layer and spinning rate and cooling temperature was investigated. At spinning rates of 30, 60, and 100 m/min and cooling temperatures of 100, 20, 8, 0, and −5° C., optical fibers were produced and the respective thicknesses of their carbon coating layers were measured using a scanning electron microscope photography. These results are shown in FIG. 8. In FIG. 8, the solid line represents a spinning rate of 30 m/min, the dotted line represents a spinning rate of 60 m/min, and the broken line represents a spinning rate of 100 m/min.

From the results shown in FIG. 8, it can be seen that regardless of the spinning rate, when the cooling temperature is no higher than 50° C., the carbon coating layer can be applied with good efficiency. It can also be seen that even at a spinning rate of 100 m/min, a sufficiently thick carbon coating layer can be formed.

While the embodiments of the present invention, as herein disclosed, constitute a preferred form, it is to be understood that other forms might be adopted.

What is claimed is:

1. A method for producing an optical fiber comprising:
   (a) providing a bare optical fiber
   (b) removing adherent foreign material from the surface of the bare optical fiber by heating and drying the surface of the bare optical fiber at a temperature of from 80° to 150° C. to vaporize the adherent foreign material while supplying an inert gas to the surface of the bare optical fiber so as to substitute, on the surface of the bare optical fiber, the inert gas for the vaporized adherent foreign material; and
   (c) forming, thereafter at least one carbon layer on the surface of the bare optical fiber using a chemical vapor deposition method.

2. An optical fiber production method as claimed in claim 1, wherein forming said at least one carbon layer by said chemical vapor deposition method is performed by thermally decomposing at least one hydrocarbon compound to obtain a thermal decomposate of the hydrocarbon, and depositing the thermal decomposate on the surface of the bare optical fiber.

3. An optical fiber production method as claimed in claim 2, wherein said hydrocarbon compound has 15 carbon atoms or less.

4. An optical fiber production method as claimed in claim 3, wherein said hydrocarbon compound includes a halogenated hydrocarbon compound.

* * * * *